Patented July 28, 1936

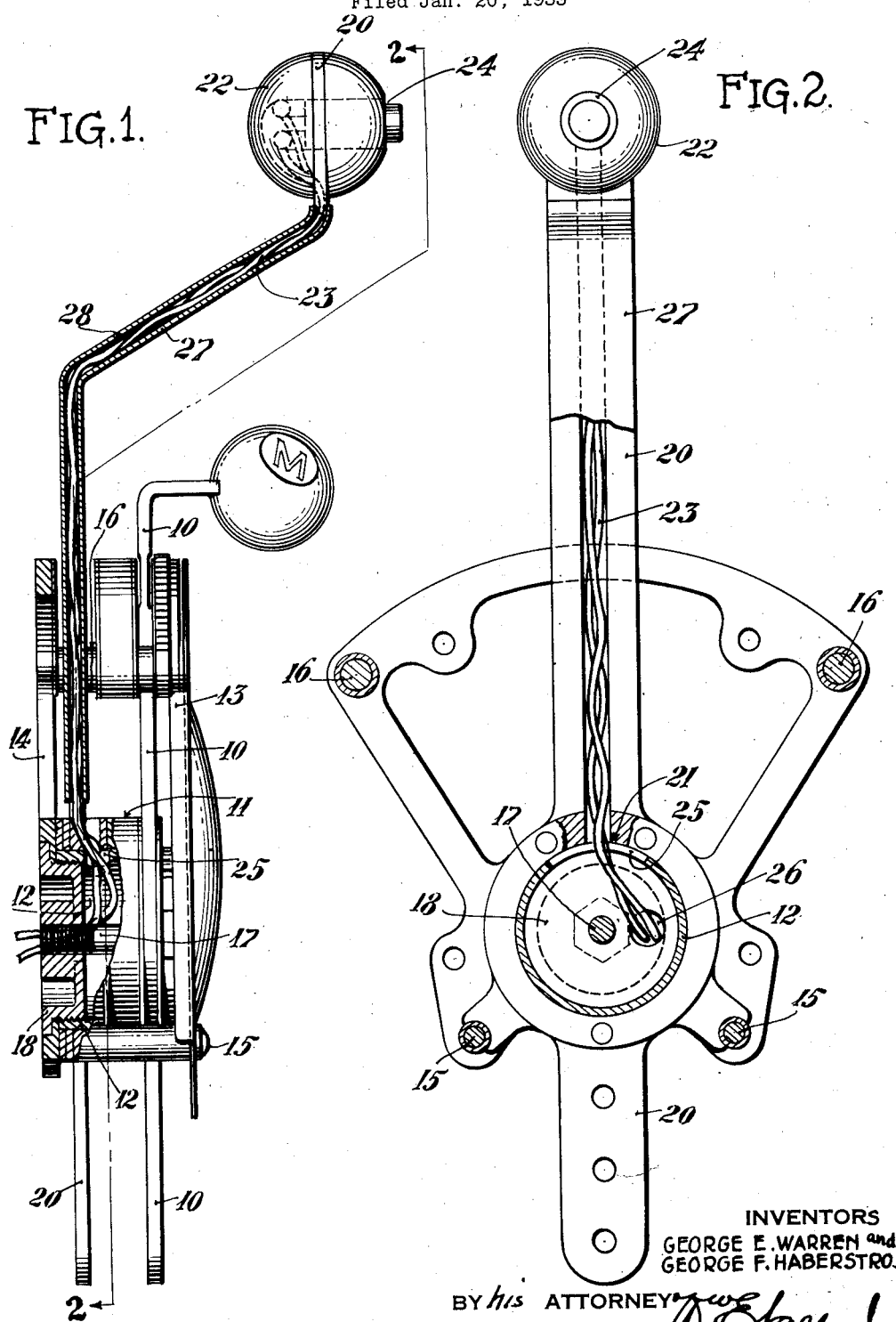

2,049,145

UNITED STATES PATENT OFFICE 2,049,145

CONTROL LEVER WITH SWITCH

George E. Warren, Kenmore, and George F. Haberstro, Jr., Buffalo, N. Y., assignors to Curtiss Aeroplane & Motor Company, Inc., a corporation of New York Application January 20, 1933, Serial No. 652,590

10 Claims. (Cl. 247—5)

Our invention relates to control devices generally and more specifically to a device for use in controlling the propelling motor and certain other operative parts of an aircraft.

Although airplanes today are, in general, less difficult to control than formerly and, due to improvements in design, probably require less attention on the part of the pilot to operate the primary or principal control elements, the addition during recent years of auxiliary equipment such as superchargers, fuel and oil pumps, retractable landing gear, manually adjustable vertical fin and horizontal stabilizer, radio and other electrically operated apparatus has more than offset developments tending to lessen the strain on the pilot by imposing much greater demands on his attention under certain conditions.

The above is particularly true in the case of devices requiring more or less constant attention during relatively long periods of operation so that it has become an essential requirement that simplification of the controls and other factors be taken into account to enable the pilot to operate several instrumentalities with one hand or the other, or by pedal actuated attachments without interfering in any respect with the operation of the primary controls.

For instance, in two-way radio communication it is desirable to give practically constant attention to certain of the radio circuits while at the same time controlling the propelling motor and maneuvering the aircraft into different positions. This would be the case during the execution of a military formation or maneuver, while in an emergency the pilot of a commercial transport, or for that matter any other type, might be compelled to send radio messages or to receive weather and other reports at frequent intervals when for the safety of passengers or cargo his attention should not be diverted from the operation of any of the principal flight controls.

The present invention, therefore, has for its object the simplification of such control processes by the provision of a device adapted to permit constant control of several instrumentalities, one of which governs a primary control of the airplane, either simultaneously or independently as desired, without unduly diverting the pilot's attention from said primary control.

It is also an object of the present invention to provide a device which will enable the pilot to obtain such control by the use of one hand only without interfering with or detracting his attention from the operation of the other controls of the airplane by the other hand and feet as in the conventional arrangement of such controls in modern types of aircraft.

A further object of the invention resides in the provision of a device of such a nature which is interchangeable with standard parts of present units whereby the same may be substituted for and used to obtain the advantages herein pointed out in airplanes already in use without the necessity for structural changes in or rearrangement of such parts, said device being free from intricacy, and adapted to be economically manufactured and assembled.

With these and other objects in view, as will appear from reading the following description of an acceptable embodiment thereof, our invention consists of the novel features of construction and arrangement of parts hereinafter fully described, claimed, and illustrated in the accompanying drawing forming a part of this specification, in which Fig. 1 is a view in elevation of our improved device shown partly in section, while Fig. 2 is a sectional view taken on line 2—2 of Fig. 1.

More specifically, in two-way radio communication it is desirable while listening for or to a message to eliminate so far as possible disturbances caused by other noises or sounds such as those produced by the engine and propeller. This may be effectively accomplished by providing an open switch in the microphone circuit which is used to cut in the microphone only when the pilot is speaking. This switch is held closed during that period only and remains open at all other times so that the engine noises are not picked up by the microphone and superimposed upon the receiving circuit to interfere with the audibility of the incoming signals or spoken messages. The pilot must therefore operate the switch intermittently throughout the duration of a two-way radio conversation while at the same time operating the principal or primary flight controls.

Radio phone transmission in aircraft is often difficult under conditions of full throttle engine operation. In order to facilitate such phone transmission, an aircraft pilot frequently throttles back his engine by means of the throttle control ordinarily installed in the craft. Then, with reduced engine noise, he is able to talk clearly, and his messages may be received readily. By the combination of the microphone cut-in switch with the throttle knob, the pilot may, with one motion, throttle back the engine and operate the microphone switch, thus making conversation simple. With this combined method of operation, the microphone is only connected at times when the engine is throttled back. When the pilot is not using the transmitter, he may again open up the throttle and, by virtue of the microphone being disconnected when his pressure upon the switch is relieved, the engine noises are not thrown into the transmitter and reception of his messages will not be confused by engine roar.

In the usual installation, whether of the wheel or stick type, the pilot operates the fore and aft and lateral equilibrium controls of the airplane with his right hand, the rudder bar or other mechanism for maintaining directional control with his feet, and the motor controls including the throttle lever mounted in convenient position at the side of the cockpit by his left hand entirely independently of the other flight controls. It becomes necessary, therefore, to use both hands and feet whenever the speed or power output of the propelling unit is regulated.

Various suggestions have been made for locating the controls for the auxiliary equipment. The adjustment for the horizontal stabilizer has been placed beneath the pilot's seat in position to be grasped by either hand, the lever for adjusting the vertical fin has been located overhead, while other control handles and electrical switches have been located on the instrument panel and in various other positions in the cockpit. It will be seen, that in order to accomplish an adjustment or control of any of the auxiliaries, it has heretofore been necessary for the pilot to temporarily remove either his right or his left hand from one of the primary controls. This may be hazardous under some conditions or at least inconvenient whenever it becomes necessary to give any great amount of attention to the auxiliary apparatus.

Referring to Figs. 1 and 2 of the drawing, a control device is shown comprising the motor control levers 10 and 20, the latter representing the throttle lever so located as to be grasped by the left hand of the pilot. The levers 10 and 20 are mounted to turn between suitable spacing members 11 on a hub 12 rigidly held between a face plate 13 and a back plate 14 in the form of a supporting bracket, by studs or equivalent members 15 and 16. A spindle 17 passes through openings in the hub 12 and in a flanged member 18 which is screwed into the threaded portion of the rear of the hub 12 to center and hold the same in position relative to the back plate 14. Only so much of the control unit and its manner of operation as is pertinent to a description and understanding of the present invention is included herein, as suitable connections leading from the levers to the throttle and other parts of the motor and the manner of attachment of the device to the fuselage framework or other part of the aircraft are well known in the art.

The lever 20 is slotted from the point 21 adjacent the hub 12 to the knob 22 to receive the insulated electrical conductors 23 which extend from a push button type switch 24 contained within the knob 22, through the lever 20 and a slot 25 in the hub 12 of sufficient dimensions to prevent cutting or chafing of the wires as the throttle lever is moved, into the hollow interior of the hub member 12, and then rearwardly through the opening 26 in the member 18 to the remainder of the electrical circuit of which they form a part.

Stiffening plates 27 and 28 secured to opposite sides of the lever 20 serve to form a closed conduit for the wires 23 so that the same are entirely protected and prevented from interfering with the operation of either lever as a primary control of the airplane. It will be seen that this method of construction readily permits a lever of the proposed type to be substituted for the original throttle lever in standard control units at present in use, as well as in new installations without alteration or replacement of any other part of the original unit unless it be deemed expedient to use a new hub 12 and member 18 which are cut and drilled to receive the wires 23. These items could also be furnished if desired at a small cost.

The advantages to be gained by use of the invention will be apparent from a brief description of its operation. With the knob 22 of the device located at the side of the pilot in such a position as to be conveniently grasped by the left hand for movement backward and forward to control the throttle of the motor, any electrical equipment adapted to be controlled by pressing a button type switch may be operated without removing the hand from the throttle lever, regardless of the position of the latter, and whether it is desired to move the lever at the same time or not to regulate the speed or power output of the propelling unit.

Consider the wires 23 as constituting a part of the microphone circuit of a combined transmitting and receiving radio by which two-way communication may be maintained. By simply pressing the button of the switch 24 the pilot may close the switch to cut in the microphone at any time or by allowing the switch to remain open the microphone is automatically cut out of the circuit to shut out the disturbances caused by the engine and other noises which it might pick up. The pilot may thus maintain complete control of the motor while at the same time opening and closing the microphone circuit depending upon whether he desires to talk or listen, by the use of his left hand only leaving his right hand and feet free to operate the other controls of the airplane.

It is thought that the full nature and manner of operation of the invention as well as an understanding of its advantages will be apparent from the above description. It is to be understood that we do not desire to be limited to the exact details shown and described, for the reason that other modifications coming within the scope of the appended claims will occur to a person skilled in the art and are intended to be included.

We claim as our invention:

1. In a device of the character described, a plate, a hub member secured to said plate, the said hub member having a slot therein, and a control lever mounted on said hub member, the said slot being adapted to receive an electrical conductor extending from said control lever into said hub member.

2. In a device of the character described, a plate having an opening therein, a hollow hub member secured to said plate, the said opening in said plate being adjacent to the axis of said hub member, and a control lever mounted on said hub member, the said opening being adapted to receive an electrical conductor extending from said control lever and passing through said hub member.

3. In a device of the character described, a plate having an opening therein, a hollow hub member secured to said plate, the said hub member having a slot therein, and a control lever mounted on said hub member adjacent to said slot, said opening being adapted to receive an electrical conductor extending from said control lever through said slot and said hub member.

4. In a device of the character described, a face plate, a back plate secured thereto, a hub member having a slot therein secured to said back plate, and a control lever mounted on said hub member between said face and back plates, the said slot being adapted to receive an electrical conductor extending from said control member into said hub member.

5. In a device of the character described, a face plate, a back plate secured thereto, said back plate having an opening therein, a hub member having a slot therein secured to said back plate, and a control lever mounted on said hub member between said face and back plates, the said slot being adapted to receive an electrical conductor extending from said control lever into said hub member and through said opening in the back plate.

6. In a device of the character described, a plate, a hub member secured thereto, the said hub member having a slot therein, and a control lever mounted on said hub member to turn thereon in a plane parallel to the plane of said plate, said slot being adapted to receive an electrical conductor extending from said control lever into said hub member.

7. In a device of the character described, a plate, a hub member secured thereto, the said hub member having a slot therein, and a control lever mounted on said hub member to turn thereon between limits defined by the length of said slot, such slot being adapted to receive an electrical conductor extending from said control lever into said hub member.

8. In a device of the character described, a plate, a hub member secured thereto, the said hub member having a slot therein, and a control lever mounted on said hub member adjacent to said slot to turn thereon in a plane parallel to the plane of said plate, said opening being adapted to receive an electrical conductor extending from said control lever through said slot and said hub member.

9. In a device of the character described, a face plate, a back plate substantially parallel thereto, said back plate having an opening therein, a hub member having a slot therein secured to said back plate and a control lever mounted on said hub member to turn thereon between said face and back plates, the said slot being adapted to receive an electrical conductor extending from said control lever into said hub member and through said opening in the back plate.

10. In a device of the character described, a plate having an opening therein, a hollow hub member secured to said plate, the said hub member having a slot therein, and a control lever mounted on said hub member to turn thereon between limits defined by the length of said slot, said opening being adapted to receive an electrical conductor extending from said control lever through said slot and passing through said hub member and said opening in a direction substantially normal to the plane of said control member.

GEORGE F. HABERSTRO, Jr.
GEORGE E. WARREN.